United States Patent
Narodny et al.

[11] 3,721,498
[51] March 20, 1973

[54] SYNTHESIZED HOLOGRAM FOR AN ARTIFICIAL OPTICAL TEMPLATE

[75] Inventors: Leo Narodny, Cold Spring Harbor; Louis E. Sharpe, Malverne, both of N.Y.

[73] Assignee: Kollsman Instrument Corporation, Syosset, N.Y.

[22] Filed: June 16, 1969

[21] Appl. No.: 833,334

[52] U.S. Cl.....................................356/109, 350/3.5
[51] Int. Cl. .....................................G01b 9/02, G02b
[58] Field of Search ........................356/106; 350/3.5

[56] References Cited

OTHER PUBLICATIONS

Binary Fraunhofer Holograms, Generated by Computer; Lohmann et al.; "Applied Optics" Vol. 6, No. 9; pp 1739 10–67;
"Holographic Synthesis of Computer–Generated Holograms"; Proceedings of the IEEE; Stroke et al.; Jan. 1967; pg. 109–111
"Computer Generation and Reconstruction of Holograms"; Lesem et al.; Modern Optics; Polytechnic Press, Brooklyn, N.Y.; March 1967, pg 681–690
"Investigation of Hologram Techniques"; Leith et al.; Dec. 1965; (Pat. Off. Oct. 1967)

*Primary Examiner*—Ronald L. Wibert
*Assistant Examiner*—Conrad Clark
*Attorney*—E. Manning Giles, J. Patrick Cagney, Peter S. Lucyshyn and Richard G. Kinney

[57] ABSTRACT

The interference patterns that would be recorded on a hologram from a complexly shaped surface such as the surface of an optical element or jet turbine blade, or the like, is calculated in a suitably programmed computer which may be coupled to an automatic plotter. The automatic plotter will then print the interference pattern which would be produced by projection of the pattern on the film in the form of dots of variable spacing or of different shading in order to produce the desired pattern. This printed pattern is then photographed with a high resolution film such as one capable of resolving four-hundred separate dots per millimeter of length, with this film serving as a hologram containing the synthesized interference pattern that represents the computed surface. The hologram or artificial optical template is then illuminated by a laser source so that a virtual image of the computed surface is produced. An object having a surface which is to be compared to the computed surface is then superimposed on the virtual image position so that an interference pattern is produced which describes the difference between the contour of the actual surface and the contour represented by the virtual image of the hologram template. The object may be a work piece which is to be surface eroded until it conforms to the desired pattern in which case the interference pattern is utilized to control the surface erosion operation.

7 Claims, 3 Drawing Figures

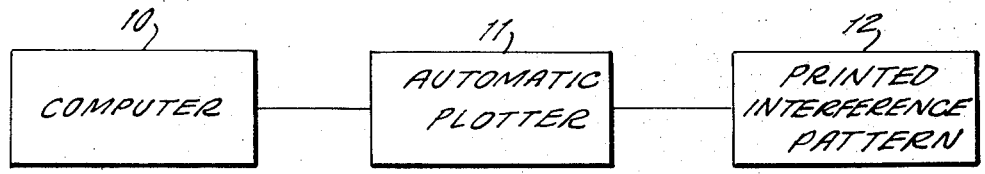

SYNTHESIZED HOLOGRAM FOR AN ARTIFICIAL OPTICAL TEMPLATE

This invention relates to apparatus and methods for providing optical representations of highly accurate, complexly contoured surface configurations, and more particularly relates to the use of a synthesized hologram which can be used as a template for comparing and measuring the contour of an ideal surface with that of a real surface with high accuracy.

Such surface comparisons have many uses, for example, the production of complexly shaped surfaces is required in many diverse fields such as the production of complex lens surfaces for optical use; the production of turbine blades for jet engines; the production of complex bearing surfaces for gas or air bearings; and the like.

Templates are commonly used to compare the actual shape of the surface being produced to the desired template shape during the course of the manufacture of such products. The use of templates, however, has limited accuracy due to inaccuracies of the template itself and due to inaccuracies which may occur in comparing the template contour to the actual surface contour being formed.

In the production of optical elements, it is a common practice to use optical flats in connection with the surface being contoured where the flat is pressed against the surface being contoured and the interference pattern created between the two is observed. By counting the number of interference fringes, it is possible to determine how far the contoured surface deviates from the flat surface. With this method, however, and where relatively sharp contours are patterned in the work surface being produced, it may become necessary to count an enormous number of fringes so that the use of interferometric techniques becomes impractical.

It is well known that a real object may be superimposed on the image position of a hologram to give rise to an interference pattern which describes the difference in contour between the real object and the hologram image. This technique is described, for example, in the February 1968 issue of "Scientific American" in the article entitled "Advances in Holography," pages 40 to 49. This technique has been used in order to compare the configuration of a particular object before and after a particular thermal treatment and to compare production items in a particular production run.

The principle of the present invention is to synthetically produce the hologram of an ideal surface contour by programming a computer which will print-out the particular hologram configuration or pattern which represents, substantially to high accuracy, the pattern that would have been produced by such a surface. This printed hologram is then photographed, and is used to produce an image of a particular object which is to be compared with the ideal surface contour. To compare the object with the ideal surface, the surface of the object is superimposed on the virtual image derived from the synthesized hologram, thereby giving rise to an interference pattern having only a limited number of interference fringes, regardless of the complexity of the surface being produced. The resultant interference pattern then accurately describes the contour differences between the desired surface contour and the actual surface contour.

In order to make the surface of polished glass visible for the comparison with the synthesized hologram, it will often be necessary to provide a temporary coating of partially reflective thin films according to standard procedures of optical coatings.

The interference pattern may be stored by photographic or other duplication or by scanning and converting the same to a corresponding time varying analog or digital electrical signal. For example, a digital readout to a computer storage for subsequent use in automatic control systems is an important adaptation of the process. Alternatively the interference pattern may be utilized for a surface contouring operation wherein a workpiece is to be contoured to the exact shape of the synthetic surface represented by the hologram image.

The photographic or other duplication is created by placing a camera with a suitable lens at the observation position 24 in FIG. 3. The lens of the camera is substituted for the lens of the eye in order to create a real image out of the virtual image interferogram when the workpiece is superimposed on the virtual image position.

While any surface contouring procedure can be used where the invention is applied for controlling the contouring of a surface, for purposes of illustrative disclosure the invention is described in relation to surface contouring accomplished by ion bombardment of the surface in an evacuated chamber, as described in copending Narodny and Cohen application Ser. No. 833,336, filed June 16, 1969, entitled METHOD AND APPARATUS FOR CONTROLLED EROSION OF SURFACES and assigned to the assignee of the present invention.

In one such arrangement, the surface being contoured is fixed within an evacuated chamber, and an ion beam scans across the surface of the work piece to produce the desired surface configuration. In accordance with the invention, the work piece may be located in the image position of the synthesized hologram so that the process of the surface contouring operation can be continuously monitored and adjusted in order to produce the surface described in the synthesized hologram.

Accordingly, a primary object of this invention is to provide a novel method for comparing and measuring differences between complexly shaped surfaces.

Another object of this invention is to provide a novel method for producing easily interpreted interference patterns from a complexly shaped surface.

A further object of this invention is to produce a synthesized hologram or artificial optical template which produces an image representative of a predetermined contour which may be used to produce an interference pattern with a real object superimposed on this hologram image.

These and other objects of this invention will become apparent from the following description taken in connection with the drawings in which:

FIG. 1 shows a block diagram of the standard apparatus which may be used for the production of a printed interference pattern;

FIG. 2 schematically illustrates the reconstruction of an image from the hologram pattern and the superposition of a real object on this image in order to generate an interference pattern between the real object and the hologram image;

FIG. 3 illustrates the manner in which the apparatus of FIG. 2 may be incorporated into a positive ion beam eroding apparatus for controllably eroding the surface configuration in the work piece which is being contoured.

Referring first to FIG. 1, there is shown in schematic fashion the manner in which the synthesized hologram pattern can be formed. In FIG. 1, a computer 10 is programmed to compute the interference pattern that would be produced in a hologram negative by a particular surface contour. The computer output is connected to a suitable automatic plotter 11 which produces a printed output pattern 12 having the form of dots which are variably spaced in order to produce a particular pattern following well-known printing techniques. The dots may be of the same density or of different gray shades as usually defined by photographic technicians. The pattern, as generated by the computer, has sufficient resolution in the form of a large enough number of points to give adequate presentation of the perfect surface.

The printed pattern is then photographed by a high resolution film which typically is capable of resolving four-hundred dots per millimeter of length so that the entire pattern can be reduced to a relatively small film area. For example, a reduction of 100 to 1 from the computer printed output pattern 12 to the actual film is quite common. This synthesized hologram or artificial optical template can then be conveniently stored.

The artificial template which is produced can be of any desired type. Typically, the template may be of the surface of a plano-convex lens used as a condensor in a slide projector. In the past, and when producing such lenses, the surface being produced was compared to a flat surface in an interferometer, with the surface contour being shown as a number of rings or fringes. Where there was very steeply sloping surface, however, a very large number of fringes were produced, each of which represents a half wave length of light which, in the visible region, represents approximately 10 microinches. Therefore, the accuracy of this method was rarely better than 1/1000 of an inch.

When producing aspheric lenses or surfaces having very steeply sloping surfaces, the number of fringes which had to be counted made the use of the interferometer difficult and often impossible.

In accordance with the invention and by producing a hologram representing the synthesized reference surface contour, the contour of the real surface can be compared directly to the desired hologram image of the surface, with the hologram being synthetically produced as described in FIG. 1 so that the accuracy far exceeds the accuracy which could be achieved where a real surface is used as the template. Any number of synthesized holograms can be used for different purposes.

FIG. 2 illustrates the placement of the synthesized hologram negative 20 which is a photograph of the printed interference pattern 12 of FIG. 1 when positioned with respect to a laser source for reproducing a visual image of the surface described by the interference pattern in synthesized hologram 20. Thus, a suitable laser source 21 is provided which has an output light beam 22 directed to a suitable optical system 23 which causes the illumination of the synthesized hologram 20.

The interference pattern recorded in the hologram 20 suitably modifies the wave fronts emanating from optical system 23 so that an observer at observation position 24 will observe the image of the pattern used to create the hologram 20, this image being positioned at location 25.

In accordance with the invention, however, the surface of the object being produced is superimposed on the image position 25, illustrated by the positioning of real object 26, so that the observer at observation position 24 will now observe an interference pattern due to differences in the surface configuration between the surface 27 of work piece 26 and the image produced by the synthesized hologram 20.

Thus, the arrangement as shown in FIG. 2 is a hologram interferometer which is particularly useful for showing the difference between a reference complex surface and a real complex surface. Such a hologram interferometer is useful for determining the amount of stress in a real surface by comparing the interference fringes before applying a stress and after applying a stress. Any part of a structure where the stress concentration is high enough for a material to reach the point of yield will not give sharp fringes so that the synthesized hologram be used as a safety device. Another application for the hologram interferometer is for comparing the shock waves from the nose of a bullet, for example, with the theoretical shock waves, thereby permitting a determination of actual velocity.

Another field of application for the hologram interferometer exists in connection with material removal operations that are to be performed on complexly shaped surfaces such as lens, turbine blades and special gas or air bearings.

The material removal means may be of any type, for example, a polishing or grinding means, or the like, may operate on the surface 27 until its pattern conforms to the synthetically created hologram image created by hologram 20. Thus, the arrangement of FIG. 2 shows a hologram interferometer having a wide range of applications including particularly the production of any complexly shaped surface 27 on a work piece 26.

FIG. 3 illustrates the use of a hologram interferometer of the type shown in FIG. 2 used in connection with a positive ion contouring system. Referring now to FIG. 3, the ion beam erosion apparatus of the above noted copending applications Ser. No. 833,336 is illustrated where, however, the progress of the erosion is monitored by comparing the surface contour of surface 27 to the artificially produced image of hologram 20 through the apparatus of FIG. 2. Note that in FIG. 3, those components which are identical to components of FIG. 2 are given identical identifying numberals.

In FIG. 3, a chamber 30 contains the work piece 26, with work piece 26 securely mounted on a suitable holder 31 carried on mount 32. Work piece 26 is carefully located so that the surface 27, after being patterned by erosion due to positive ions, will coincide with the surface image produced by hologram 20. A window 33 having highly accurate, parallel, flat surfaces is provided in housing 10 so that surface 27 may be illuminated from the externally located holograph equipment without distortion due to window 33.

a vacuum system 34 is connected to the interior of chamber 30 and holds the chamber to a vacuum of about $10^{-6}$ Torr. Preferably, the vacuum connection is made where it will provide a clean vacuum without turbulent flow adjacent the work piece 26. The vacuum is monitored by a suitable vacuum gauge 35.

A source of ions 36 is then secured to the top of chamber 30, and generally consists of a source 37 of a suitable gas such as argon, a vacuum valve 38, a filament 39, and suitable focusing and accelerating grids and plates 40. A suitable source of a positive ion beam is the commercially available positive ion source known as the ORTEC 350 DUO PLASMATRON. This device generates a beam of argon ions having a current of up to 2 milliamperes, using an 8 mil aperture, with ion energies of about 60,000 volts. The ions are focused into a beam having a diameter of about 3 millimeters.

The beam 41 produced by the beam generator 36 is focused by an electrostatic lens 42 of any desired type such as an Einzel lens, and a set of electrostatic deflection plates 43 surrounds the beam 41 to provide two-axis deflection of the beam. Typically, deflection plates 43 are about 6 inches long and are spaced about 3 inches apart.

In the general operation of the system of FIG. 3, erosion rates will be obtained of about 1 to 2 angstroms in depth per microampere per square centimeter per minute. For a typical beam current of 100 microamperes, this amounts to the removal of about 1 to 2 wavelengths of green light per minute for metal, glass and dielectric surfaces.

A specific sequence of beam scans for the ion beam 41 can be commanded to the ion beam by means of a preprogrammed electronic computer, as described in above-noted application Ser. No. 833,336 in order to provide motion of the beam across the surface 27 to effect a predictable alteration of the surface within a small fraction of the wavelength of green light. These scan patterns may be continuous spirals, quantized circles, TV rasters, and the like. Similarly, the movement of beam 41 over surface 27 can be controlled manually.

The progress of the erosion is then observed from observation positions 24 in FIG. 3 by virtue of the interference fringes which are produced between the actual surface configuration 27 and the desired surface configuration which is synthetically produced by hologram 20. Obviously, the fringes observed at observation position 24 could be used in a suitable automatic control system to control the movement of beam 41 until the desired surface contour is obtained.

Although this invention has been described with respect to particular embodiments, it should be understood that many variations and modifications will now be obvious to those skilled in the art and, therefore, the scope of this invention is limited not by the specific disclosure herein, but only by the appended claims.

The embodiments of the invention in which an exclusive privilege or property is claimed are defined as follows:

1. A process of contouring a surface of a real object comprising the steps of programming a computer to control generation of a real pattern representing, substantially to mathematical accuracy, the uniquely characteristic interference pattern of an ideal surface contour that is to be provided on the surface of the real object, generating said real pattern, producing a hologram embodying said real pattern, exposing the hologram to a laser beam to superimpose a virtual image of the hologram upon a real image of the surface of the real object to develop an interference pattern between said virtual image and said real image and interferometrically monitoring the last-named interference pattern while removing material from the surface of the real object.

2. A process in accordance with claim 1 wherein the generating step includes producing a printed pattern, wherein the producing step includes photographing the printed pattern to produce a photographic negative, and wherein the exposing step includes exposing the negative to a laser beam to produce the virtual image.

3. A process in accordance with claim 1 wherein said real object is an optical element to be provided with a complex surface.

4. A process in accordance with claim 3 wherein said complex surface is to be aspheric and characterized by steeply sloping surfaces.

5. A process in accordance with claim 1 wherein material is removed by a beam of positive ions.

6. A process in accordance with claim 1 wherein the monitoring step includes automatically controlling the removal of material according to the preselected erosion pattern determined by the uniquely characteristic interference pattern of the ideal surface contour.

7. A process in accordance with claim 1 wherein material is removed by a beam of positive ions which is automatically controlled according to the preselected erosion pattern determined by the uniquely characteristic interference pattern of the ideal surface contour.

* * * * *